(12) United States Patent
Clauss et al.

(10) Patent No.: US 8,074,961 B2
(45) Date of Patent: Dec. 13, 2011

(54) MAGNETIC VALVE WITH MANUAL OVERRIDE

(75) Inventors: Carsten Clauss, Esslingen (DE); Ralf Forcht, Wendlingen (DE); Thomas Lederer, Kernen (DE); Christian Waldeck, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 718 days.

(21) Appl. No.: 12/284,125

(22) Filed: Sep. 18, 2008

(65) Prior Publication Data

US 2009/0078896 A1    Mar. 26, 2009

(30) Foreign Application Priority Data

Sep. 20, 2007 (DE) .......................... 10 2007 045 028

(51) Int. Cl.
*F16K 31/02* (2006.01)

(52) U.S. Cl. ............... 251/129.03; 324/525; 324/542; 324/609; 361/93.1; 251/129.15

(58) Field of Classification Search ............. 251/129.03, 251/129.15; 324/525, 542, 606, 607, 609, 324/647, 145, 257; 361/93.1, 170
See application file for complete search history.

(56) References Cited

U.S. PATENT DOCUMENTS

| | | | | |
|---|---|---|---|---|
| 1,898,242 | A | * 2/1933 | Chandler | 251/76 |
| 3,988,664 | A | * 10/1976 | Beery et al. | 324/423 |
| 4,422,619 | A | * 12/1983 | Griffiths | 251/129.03 |
| 4,494,096 | A | * 1/1985 | Fuzzell | 335/170 |
| 4,679,017 | A | * 7/1987 | Mishler et al. | 335/164 |
| 4,823,825 | A | * 4/1989 | Buchl | 137/1 |
| 4,871,989 | A | * 10/1989 | Gross | 335/164 |
| 4,873,606 | A | * 10/1989 | Pannier | 361/152 |
| 4,974,622 | A | * 12/1990 | Rader | 137/1 |
| 5,889,405 | A | * 3/1999 | Yanai et al. | 324/522 |
| 6,155,654 | A | * 12/2000 | Oyama | 303/117.1 |
| 6,262,620 | B1 | * 7/2001 | Jenski et al. | 327/424 |
| 6,985,345 | B2 | * 1/2006 | Hermann et al. | 361/139 |

FOREIGN PATENT DOCUMENTS

DE       3941643       5/1991

* cited by examiner

*Primary Examiner* — John Rivell
*Assistant Examiner* — Minh Le
(74) *Attorney, Agent, or Firm* — Hoffmann & Baron, LLP

(57) ABSTRACT

Proposed is a magnetic valve with manual override, through the actuating element of which a magnetic core that serves as a valve element or that is connected to a valve element can be shifted from an off position into an operating position without excitation of a magnetic coil system assigned to it. To detect the position of the magnetic core that is held in the operating position by the manual override there is provided a coil current monitoring device that monitors the rise of the coil current after the magnetic coil system has been switched on, which device has a detection device for detection of the absence of a drop in current as formed by movement of the magnetic core after being switched on and a signaling device for electrical signaling of a position of the magnetic core that is held in the operating position by the manual override if said drop in current is absent.

20 Claims, 3 Drawing Sheets

MAGNETIC VALVE WITH MANUAL OVERRIDE

This application claims foreign priority benefits under 35 U.S.C. §119 of German Patent Application No. 10 2007 045 028.3 filed on Sep. 20, 2007 which is incorporated by reference herein in its entirety.

BACKGROUND OF THE INVENTION

The invention concerns a magnetic valve with a manual override in accordance with the generic part of Claim 1.

Such a magnetic valve is known, for example, from DE 39 41 643 C1; said valve can be actuated by means of mechanical manual operation without a supply of current so that the switching state of the magnetic valve is no longer dependent on the flow of current. In this way reliable actuation is enabled before a system also operates "electrically," thus manual operation of actors such as a cylinder is achieved. This can also be advantageous during servicing. With the usual latching manual overrides, the magnetic core or the valve element remains in the operating position set by the manual override until unlatching takes place. This can lead to problems, since if one forgets to reset the manual override, the valve can take the wrong valve setting in subsequent operation. If a large number of magnetic valves is used, for example in a large industrial plant, it is then very difficult to find the magnetic valve or valves in which the manual override was not reset.

Usually one can detect the pushed-in position of the actuating element of the manual override visually, but only upon close inspection, so that the corresponding reexamination of a large number of magnetic valves is very complicated and time-consuming. Additional sensors, in particular position sensors, for detecting the position of the valve element make a valve complicated and expensive.

SUMMARY OF THE INVENTION

A task of this invention thus is to design a magnetic valve with manual override in which the position of the manual override can be detected in a simple way without additional sensor means.

This task is solved in accordance with the invention by a magnetic valve with the characteristics of Claim 1.

In accordance with the invention, the fact that the valve element or the magnetic core is still in the operating position if the manual override has not been reset can be advantageously detected in a simple way by monitoring the flow of current when the system is subsequently switched on. Additional sensors are not necessary for this. Detection takes place electrically, so that an appropriate signal can be reported in a simple way, and/or can be sent to a higher-level system or to a control center. In this way, even if there is a large number of magnetic valves, one can rapidly and easily determine the ones in which the manual override is still in the actuated position.

Advantageous further developments and improvements of the magnetic valve specified in Claim 1 are possible through the measures listed in the dependent claims.

The coil current monitoring device expediently has a current measuring element, especially a current measuring resistance, in the magnetic coil circuit. This forms one component of the coil current monitoring device and thus is independent of the magnetic valve itself or its mechanical system.

In an expedient development, the detection unit has a peak current memory for the coil current and a threshold stage that generates a signal in the signaling device if a preset difference value between the coil current and the peak current is not reached. In this case, adjustment means for setting the preset difference value are preferably provided in order to be able to make adjustments for the particular magnetic valve and its current behavior. Expediently, a subtracting stage is provided to form the difference value.

In order to be able to detect uncorrected movement of the magnetic core in addition to detecting an unreset manual override with the same coil current monitoring device, means are advantageously provided to detect a time shifted current drop, where the signaling means are designed to generate a signal indicating said uncorrected movement.

Visual signaling means preferably have at least one LED. In a preferred design of the magnetic valve, a spring element keeping the magnetic core in the off position is provided, and the force of motion is directed against the spring element both when the valve is actuated by the manual override and electrically.

One embodiment example of the invention is shown in the drawing and is explained in more detail in the following description. Here:

DETAILED DESCRIPTION OF THE PREFERRED EMBODIMENTS

Figure 1:
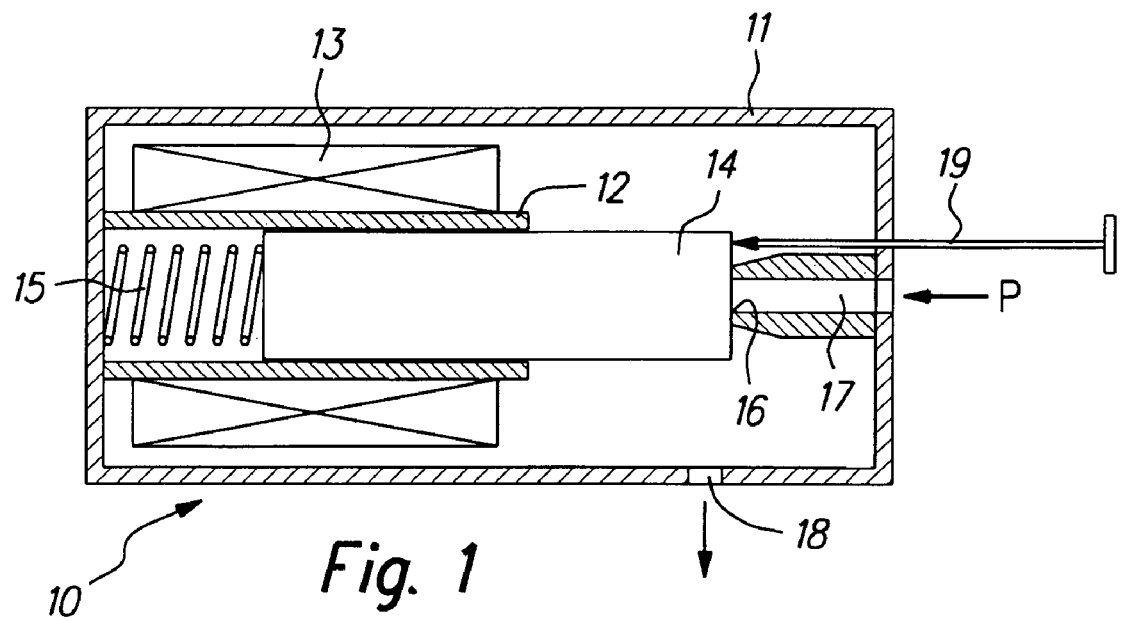
FIG. 1 shows a schematically drawn magnetic valve in its closed off position.
Figure 2:
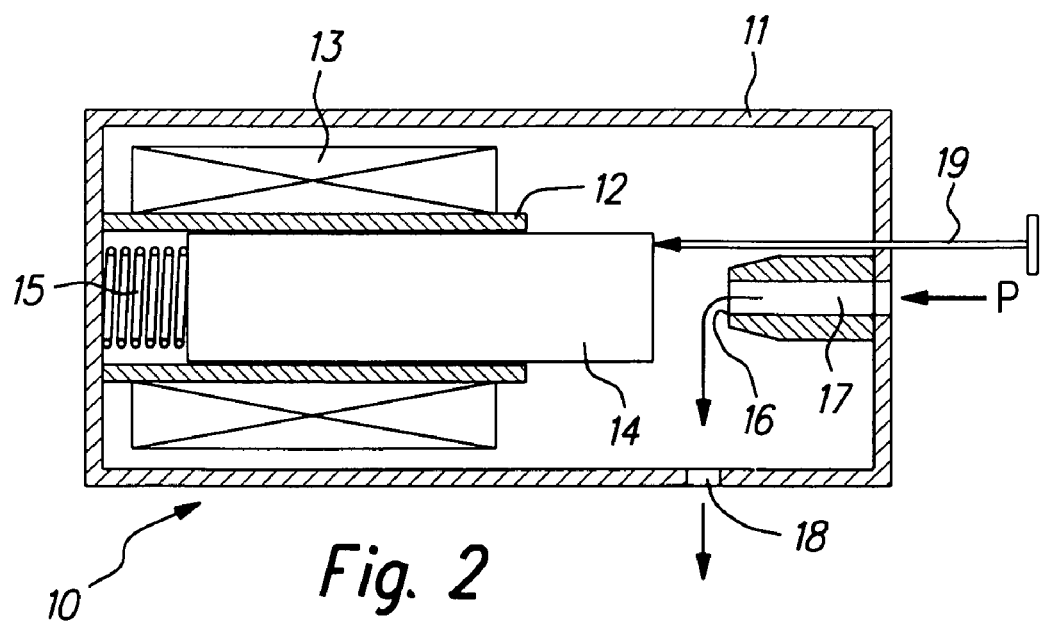
FIG. 2 shows the same magnetic valve in operating position opened by the manual override.

FIGS. 1 and 2 schematically show a magnetic valve 10, as is known in many variations. A tubular coil holder 12, on which a magnetic coil 13 is secured, is arranged in a valve housing 11. A magnetic core 14 that is made as a valve element is introduced into coil holder 12 so as to be movable back and forth. If the magnetic coil 13 is supplied with current, the magnetic core 14 moves against the force of a spring 15 into the coil holder 12 and releases a valve seat 16 that was previously closed in the off position. A fluid delivery channel 17 that is supplied at a pressure P fits into the valve seat 16. If the magnetic core 14 is in the operating position shown in FIG. 2, fluid can flow through the fluid delivery channel 17 and valve seat 16 to an outlet connection 18.

The magnetic core 14 in the embodiment example is shown as a plunger that simultaneously forms the valve element. However, it is also possible for a differently designed magnetic core to be linked to a valve element via a connecting element. In addition, multiple magnetic valve arrangements are also possible. The valve, which is only shown schematically, can also have and connect various fluid passages and can be designed as a one-way or a multipath valve.

A mechanical actuating element 19 of a manual override acts mechanically on the magnetic core 14 and serves to actuate the magnetic valve 10 when current is not flowing through the magnetic coil 13. The mechanical actuation has priority, and the switching state of the magnetic valve is then no longer dependent on the flow of current. If the magnetic core 14 is shifted into the operating position by means of the actuating element 19, a latching (not shown) takes place there, so that the magnetic core 14 then remains in the working position until a resetting takes place, which can either take place by means of the actuating element 19 or a separate unlatching device.

Figure 3:
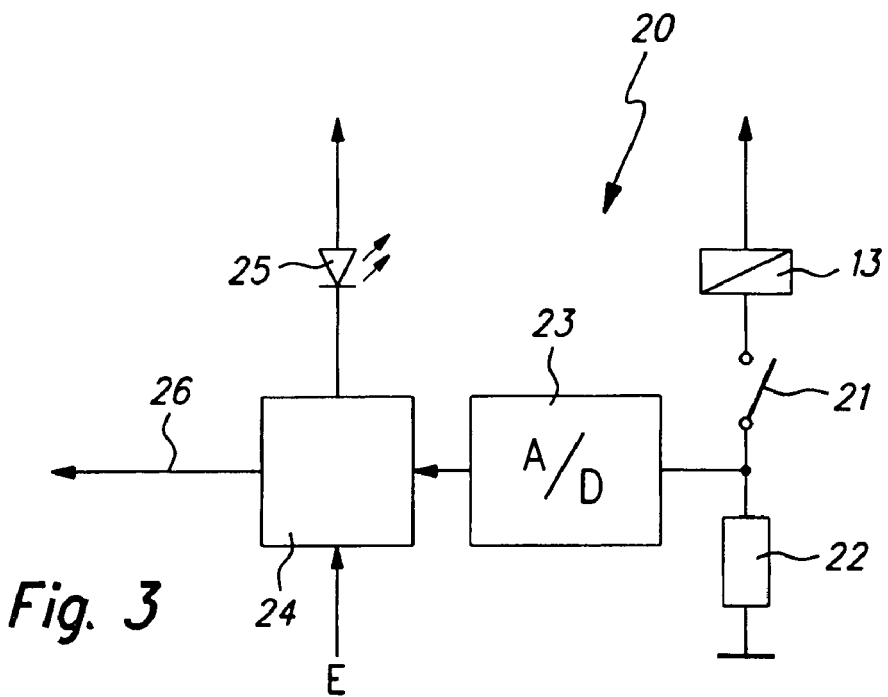
FIG. 3 shows a block diagram of a coil current monitoring device for explanation of the mode of operation.

The coil current monitoring device 20 shown as a block diagram in FIG. 3 serves to verify the position of the magnetic core 14, thus to determine if it is still in the operating position brought about and latched by the actuating element 19. If, for example, unlatching inadvertently does not occur, so that the magnetic core 14 is held in the operating position independently of the flow of current through magnetic core 13, this can lead to unpleasant disruptions and effects within a machine or plant in its subsequent operation. Thus, the coil current monitoring device 20 checks to see if the magnetic core 14 is in the normal off position when the magnetic coil is switched on or in an operating position produced by the manual override.

The magnetic coil 13 together with a switch 21 and a current measurement resistance 22 forms a series circuit across which the supply or operating voltage is applied. The current-dependent voltage tapped at the current measurement resistance 22 is sent via an analog/digital converter 23 to a detection device 24, as is shown in example in FIG. 3. Of course, in principle an analog evaluation is also possible, thus direct evaluation of the voltage taken off at the current measurement resistance 22.

If it is established in detection device 24 that when switch 21 is turned on the magnetic core 14 is already erroneously in the operating position, this will then be indicated visually by an LED 25, where in principle other visual or acoustic means such as a display, an audible alarm signal or the like can be employed. In addition, an appropriate alarm notice or signaling of the detected state of the magnetic core 14 can also be reported via a reporting circuit 26 to a control center or another higher level system. This can also take place wirelessly via radio, infrared or the like.

To adjust the detection device 24 to different magnetic valves 10, tolerances, or different magnetic valve properties, the adjustment parameters E for detection device 24 can be modified.

Figure 4:
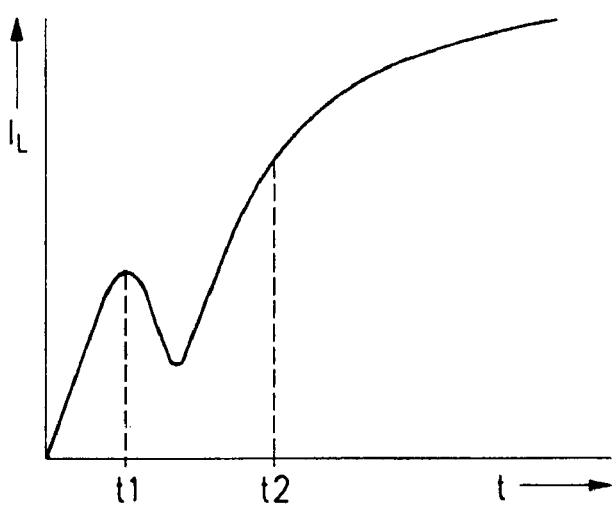
FIG. 4 shows a signal diagram that shows the initial current with the magnetic core moving.

FIG. 4 shows the flow of coil current $I_L$ through magnetic coil 13, as formed after actuation of the valve on and movement of the magnetic core 14 from the off position to the operating position. The magnetic core 14 does not move until time t1 after the required magnetic field has formed. During the motion of the magnetic core 14 there is initially a drop of current due to induction. Only after that does a further rise of current up to a peak value take place.

Figure 5:
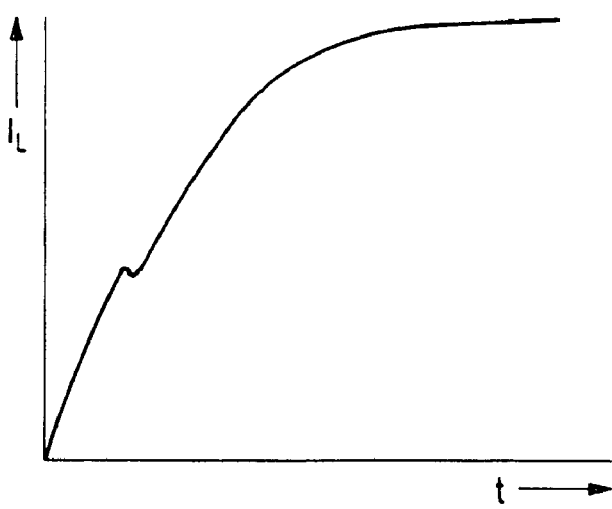
FIG. 5 shows a signal diagram that shows the initial current with the magnetic core held in an operating position by the manual override.

FIG. 5 shows the course of the current $I_L$ as formed when magnetic core 14 is already in the operating position at the time the valve is switched on, when the core was previously put into the said position by the manual override and left latched there. For this reason the magnetic core 14 cannot move or can move only very little as a consequence of play in the latching mechanism when the current is switched on, so that only a very small drop in current as shown, or even no drop of current at all, is the result.

Figure 6:
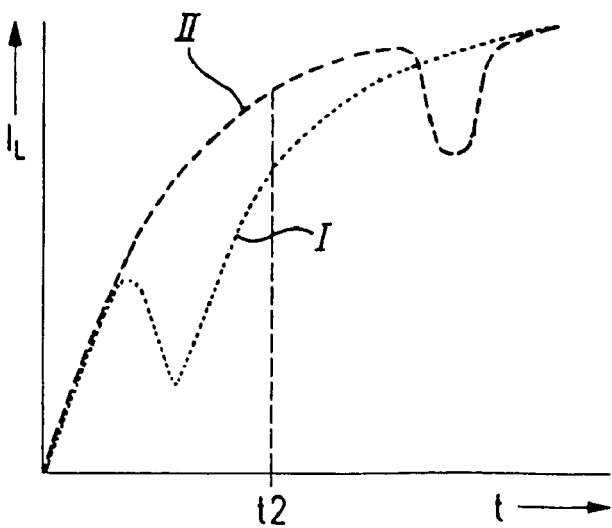
FIG. 6 shows a signal diagram that shows the initial current in the case of a normally moving magnetic core and a magnetic core whose movement is delayed.

FIG. 6 shows two current flows. Flow I corresponds to the flow shown in FIG. 4 and indicates the conditions if the magnetic core 14 moves from the off position to the operating position in accordance with the normal operation. Flow curve II shows a delay in the beginning of movement of the magnetic core 14, so that the drop of current takes place considerably later. This can be due, for example, to dirt, wear or other errors, and in any case represents erroneous behavior of the magnetic valve, which can likewise be evaluated and indicated, as is represented in still more detail in connection with FIG. 7.

Figure 7:
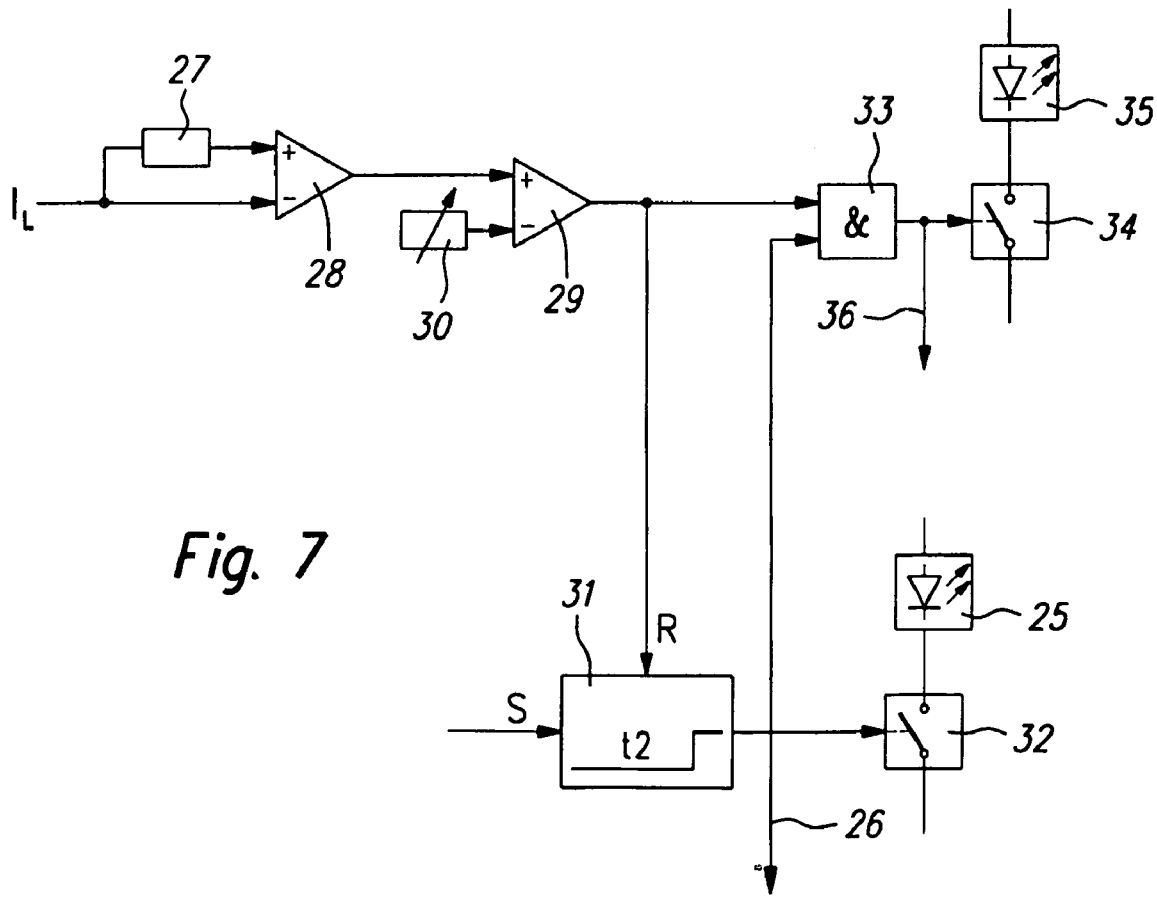
FIG. 7 shows a circuit diagram of a detection device for detection of the lag of the initial current formed by the movement of the magnetic core after actuation.

The detection device 24 shown schematically in FIG. 3 and in more detail as an example in FIG. 7 serves to detect the presence of normal behavior of the magnetic core shown in FIG. 4 or the behavior shown in FIG. 5, which is caused by latching of the magnetic core 14 in the operating position.

The measured value of the coil current $I_L$ is in accordance with FIG. 3 sent to a peak current memory 27 as a digital value or, alternatively, as an analog value, where in each case the maximum applied current is stored. This peak current value is compared in a subtracting stage 28 with the actual value measured in each case. Up to time t1 the peak current value corresponds to the actual measured value, so the output signal of the subtracting stage 28 is zero. After time t1, the difference increases as a consequence of the drop of current, so that the output value of the subtracting stage 28 rises. It is compared in a threshold stage 29 with a set parameter value, which can be variably preset by a preset device 30. This setting parameter value is chosen so that it is exceeded if the current curve is normal in accordance with FIG. 4 so that the threshold stage 29 generates an output signal that indicates current flow in accordance with normal conditions, while the said setting parameter value is not reached if the drop of current is low in accordance with FIG. 5 or if there is no drop of current at all, so that no output signal is generated. This very brief output signal is stored, for example, in a connected memory (not shown) and is available there.

A time delay element 31 is triggered by a switching signal S from switch 21 and after a time delay t2 generates an output signal, through which the LED 25 is switched on by a switch 32. The already described error report takes place at the same time via the reporting circuit 26. The time delay t2 is set so that at this time, in accordance with FIG. 4, the normal drop of current caused by the start of movement of magnetic core 14 must have been completed. However, if this drop of current takes place, the time delay element 31 is reset or deactivated via the output of the threshold stage 29 so that no switching signal to switch on LED 25 can be generated. Thus, if LED of 25 is switched on, this reliably indicates that the magnetic core 14 is, undesirably, in the operating position or has been left latched there.

In order to be able to indicate an erroneous late movement or start of movement of the magnetic core 14 as is shown by the current curve II in FIG. 6, the output signal of the threshold stage 29 and the output signal of the time delay element 31 are sent to an AND element 33, the output of which can actuate a switch 34 to turn on an additional LED 35. An appropriate alarm signal can be sent via an additional reporting circuit 36 to a higher level control, and the reporting circuits 26 and 36 can also form a common reporting circuit or the alarm or information signals can be transmitted wirelessly.

If the drop in current takes place in the normal way in accordance with current curve I, thus before time t2, there will be no signal at the output of the time delay element 31, so that the AND element 33 is blocked and LED 35 does not turn on. If on the other hand, the drop in current takes place in accordance with current curve II, after time t2, and a signal is still present at the output of the time delay element 31, shortly before it is reset, then the AND element 33 switches LED 35 on and reports delayed movement of magnetic core 14, where an appropriate report signal is also additionally or alternatively sent. Also, if there is a delayed drop of current in accordance with current curve II, a resetting or deactivation of the time delay element 31 takes place, so that an already switched on LED 25 is switched off again. Since there are only a few milliseconds between the switching on and off in such a case, the switching on visually appears only briefly. To keep the LED 35 from being switched off during this resetting a memory system (not shown) is connected to the AND element 33 or the AND element 33 itself has an appropriate signal memory.

In the case of complex control systems with a large number of magnetic valves, for example, all of the magnetic valves can be switched on and off briefly in order to be able to detect in the described way magnetic valves that are possibly latched in the operating position. In the case of normal start of operation, then the report will take place in each case if a latched valve is controlled where after an appropriate report an unlatching can be carried out.

The circuit diagram of the described functions of the detection device 24 that is shown in FIG. 7 can, of course, also be implemented digitally with the help of a microcontroller, PLD or ASIC. In this cased, the A/D converter 23 in such a system can also be integrated into the detection device 24.

The invention is explained by means of a single magnetic valve. Of course, it is correspondingly also applicable in the case of a multipole or field bus valve bank (valve island). The signals of the reporting circuits 26 and 36, can, for example, be sent to a common field bus station or to another common control device and from there sent in series or in parallel to a higher level control.

The invention claimed is:

1. A magnetic valve with a manual override, through the operating element of which a magnetic core, which serves as a valve element or that is connected to a valve element, can be shifted from an off position into an operating position without excitation of a magnetic coil system as assigned to it, and with detection means for detection of the position of the magnetic core that is held in the operating position by the manual override, characterized by the fact that as a detection means there is provided a coil current monitoring device that monitors the rise of coil current after switching on the magnetic coil system, which has a detection device for detection of the absence of a drop in current produced by movement of the magnetic core after being switched on and a signaling device for electrical signaling of a position of the magnetic core held in the operating position by the manual override when a said drop in current is absent.

2. A magnetic valve as in claim 1, wherein the coil current monitoring device has a current measurement element, in particular a current measurement resistance, in the circuit of the magnetic coil system.

3. A magnetic valve as in claim 1 wherein the detection device has a peak current value memory for the coil current and a threshold stage that generates a signal in the signaling device if a preset difference value between the coil current and the peak current value is not achieved.

4. A magnetic valve as in claim 3, wherein adjustment means are provided to adjust the preset difference value.

5. A magnetic valve as in claim 3 wherein a subtracting stage is provided to form the difference value.

6. A magnetic valve as in claim 3 wherein means are provided to detect a drop in current that is shifted in time and that signaling means are designed to generate a signal indicating uncorrected movement of the magnetic core for this case.

7. A magnetic valve as in claim 6 wherein the signaling means are designed as visual and/or acoustic signaling means and/or are designed to send an electric signal to a control center or to a higher level system.

8. A magnetic valve as in claim 7 wherein the signaling means have at least one LED.

9. A magnetic valve as in claim 1 wherein the magnetic core that serves as a valve element is designed as a plunger.

10. A magnetic valve as in claim 1 wherein a spring element that holds the magnetic core in the off position is provided.

11. A magnetic valve as in claim 1 wherein the manual override has means to hold the magnetic core in the operating position after being actuated by the actuating element.

12. A magnetic valve as in claim 1 wherein the detection device is designed as a microcontroller, PLD or ASIC or contains such.

13. A magnetic valve as in claim 1 wherein an A/D converter is integrated into the detection device or that the detection device is connected to such an A/D converter.

14. A magnetic valve as in claim 2 wherein the detection device has a peak current value memory for the coil current and a threshold stage that generates a signal in the signaling device if a preset difference value between the coil current and the peak current value is not achieved.

15. A magnetic valve as in claim 4 wherein a subtracting stage is provided to form the difference value.

16. A magnetic valve as in claim 4 wherein means are provided to detect a drop in current that is shifted in time and that signaling means are designed to generate a signal indicating uncorrected movement of the magnetic core for this case.

17. A magnetic valve as in claim 6 wherein the signaling means are designed as visual and/or acoustic signaling means and/or are designed to send an electric signal to a control center or to a higher level system.

18. A magnetic valve as in claim 2 wherein the magnetic core that serves as a valve element is designed as a plunger.

19. A magnetic valve as in claim 2 wherein a spring element that holds the magnetic core in the off position is provided.

20. A magnetic valve as in claim 2 wherein the manual override has means to hold the magnetic core in the operating position after being actuated by the actuating element.

* * * * *